US008521343B2

(12) United States Patent
Spinelli

(10) Patent No.: US 8,521,343 B2
(45) Date of Patent: Aug. 27, 2013

(54) METHOD AND SYSTEM TO AUTONOMOUSLY DIRECT AIRCRAFT TO EMERGENCY-CONTINGENCY LANDING SITES USING ON-BOARD SENSORS

(75) Inventor: Charles B. Spinelli, Bainbridge Island, WA (US)

(73) Assignee: The Boeing Company, Chicago, IL (US)

( * ) Notice: Subject to any disclaimer, the term of this patent is extended or adjusted under 35 U.S.C. 154(b) by 83 days.

(21) Appl. No.: 13/196,855

(22) Filed: Aug. 2, 2011

(65) Prior Publication Data

US 2013/0035810 A1 Feb. 7, 2013

(51) Int. Cl.
*G06F 19/00* (2011.01)
(52) U.S. Cl.
USPC ............................................................ 701/17
(58) Field of Classification Search
USPC .......................................................... 701/17
See application file for complete search history.

(56) References Cited

U.S. PATENT DOCUMENTS

| 6,219,594 | B1* | 4/2001 | Nicosia et al. ................... 701/16 |
| 7,689,328 | B2 | 3/2010 | Spinelli |
| 2002/0004692 | A1* | 1/2002 | Nicosia et al. ................... 701/16 |
| 2010/0152933 | A1 | 6/2010 | Smoot et al. |
| 2010/0204919 | A1* | 8/2010 | Becker et al. ...................... 702/5 |
| 2010/0208244 | A1* | 8/2010 | Earhart et al. ............ 356/139.01 |
| 2011/0264312 | A1* | 10/2011 | Spinelli et al. ................... 701/16 |

* cited by examiner

*Primary Examiner* — James Trammell
*Assistant Examiner* — Michael D Lang
(74) *Attorney, Agent, or Firm* — Felix L. Fischer

(57) ABSTRACT

A system for autonomous direction of an aircraft to emergency/contingency landing sites incorporates a terrain mapping sensor and an onboard processor receiving terrain data from the terrain mapping sensor. The processor employs software modules for processing the terrain data to produce a terrain map and for creating a landing profile based on the terrain map.

20 Claims, 6 Drawing Sheets

US 8,521,343 B2

METHOD AND SYSTEM TO AUTONOMOUSLY DIRECT AIRCRAFT TO EMERGENCY-CONTINGENCY LANDING SITES USING ON-BOARD SENSORS

REFERENCE TO RELATED APPLICATIONS

This application is co-pending with application Ser. No. 12/764,797 entitled Determining Landing Sites For Aircraft filed on Apr. 21, 2010, application Ser. No. 13/196,826 entitled Flight Interpreter For Captive Carry Unmanned Aircraft Systems Demonstration and application Ser. No. 13/196,844 entitled Enhanced Delectability of Air Vehicles for Optimal Operations in Controlled Airspace filed substantially concurrently herewith, all having a common assignee with the present application, the disclosures of which are incorporated herein by reference.

BACKGROUND INFORMATION

1. Field

Embodiments of the disclosure relate generally to the field of controlled flight for manned and unmanned aircraft systems, and more particularly a system and method for using on-board sensors to identify areas in the terrain in proximity to a manned aircraft or unmanned aircraft system (UAS) that have reachable landing site(s). The system manages the UAS or manned aircraft to a safe landing site in engine-out or other emergency conditions, and determines the best landing site taking into consideration the aero-performance and kinematic characteristics of the aircraft in its current operational state, the profile and extent of the terrain, and obstacle avoidance. It then generates and displays and/or implements the best path (course) to the landing site.

2. Background

Aircraft, particularly light aircraft and UAS, often fly over terrain in which a requirement for landing at a location other than the intended landing site due to an in-flight emergency or other situation presents a significant challenge. The problem of selecting a suitable emergency landing site is a complex issue that has been exacerbated by the continued growth of previously undeveloped, underdeveloped, and/or unoccupied areas. During an inflight emergency, pilots have previously been limited to using their planning, experience, vision, and familiarity with a given area to select an emergency landing site. During an emergency situation, a pilot may have little time to determine that an emergency landing needs to be executed, to find or select a suitable landing site, to execute other aircraft emergency procedures, to prepare passengers, and to then pilot the aircraft to the selected landing site. Currently there is no method for autonomously determining an adequate landing site for an aircraft in duress or directing the aircraft there.

It is therefore desirable to provide a method and system for autonomously identifying areas in the terrain in proximity to an aircraft that have reachable landing site(s) for contingency operations such as engine-out or other emergency conditions, detecting and determining the best landing site taking into consideration the aero-performance and kinematic characteristics of the aircraft in its current operational state, the profile and extent of the terrain, and obstacle avoidance and providing that information for implementation by the pilot or aircraft systems.

SUMMARY

Embodiments described herein provide a system for autonomous direction of an aircraft to emergency/contingency landing sites which incorporates a terrain mapping sensor and an onboard processor receiving terrain data from the terrain mapping sensor. The processor employs software modules for processing the terrain data to produce a terrain map and for creating a landing profile based on the terrain map.

The embodiment allows a method for autonomous direction of an aircraft to emergency/contingency landing sites wherein an onboard sensor is used for selecting potential landing sites and a landing profile is generated based on a selected one of said potential landing sites.

In a particular embodiment, the method provides for initiating a terrain mapping sensor and sensing of local terrain in proximity to the aircraft with the terrain mapping sensor receiving actual terrain environment data. The terrain environment data is then processed into a digital terrain map and potential landing sites are determined based on the sensed terrain identified in the map taking into account surface characteristics corresponding to landing site criteria. Landing sites are then loaded into a landing site library. If a forced landing is imminent a landing site best meeting a set of constraint criteria is chosen. A route to the chosen landing site is calculated employing the constraints data and the calculated route is flown to execute a landing.

The features, functions, and advantages that have been discussed can be achieved independently in various embodiments of the present invention or may be combined in yet other embodiments, further details of which can be seen with reference to the following description and drawings.

DETAILED DESCRIPTION

The embodiments described herein provide a system and method for using on-board sensors (such as or Light Detection and Ranging (LIDAR) or a Synthetic Aperture Radar (SAR)) as a means to identify areas in the terrain in proximity to a manned aircraft or unmanned aircraft system (UAS) that have reachable landing site(s) for contingency operations such as engine-out or other emergency conditions. The system detects and determines the best landing site, taking into consideration the aero-performance and kinematic characteristics of the aircraft in its current operational state (e.g. loss of aero performance or loss of engine); the profile and extent of the terrain, and obstacle avoidance. The best path (course to the landing site is then generated and displayed to the pilots, including waypoints and margins. In the case of a UAS, the system will autonomously command and control the aircraft to the optimal landing site.

Figure 1A:
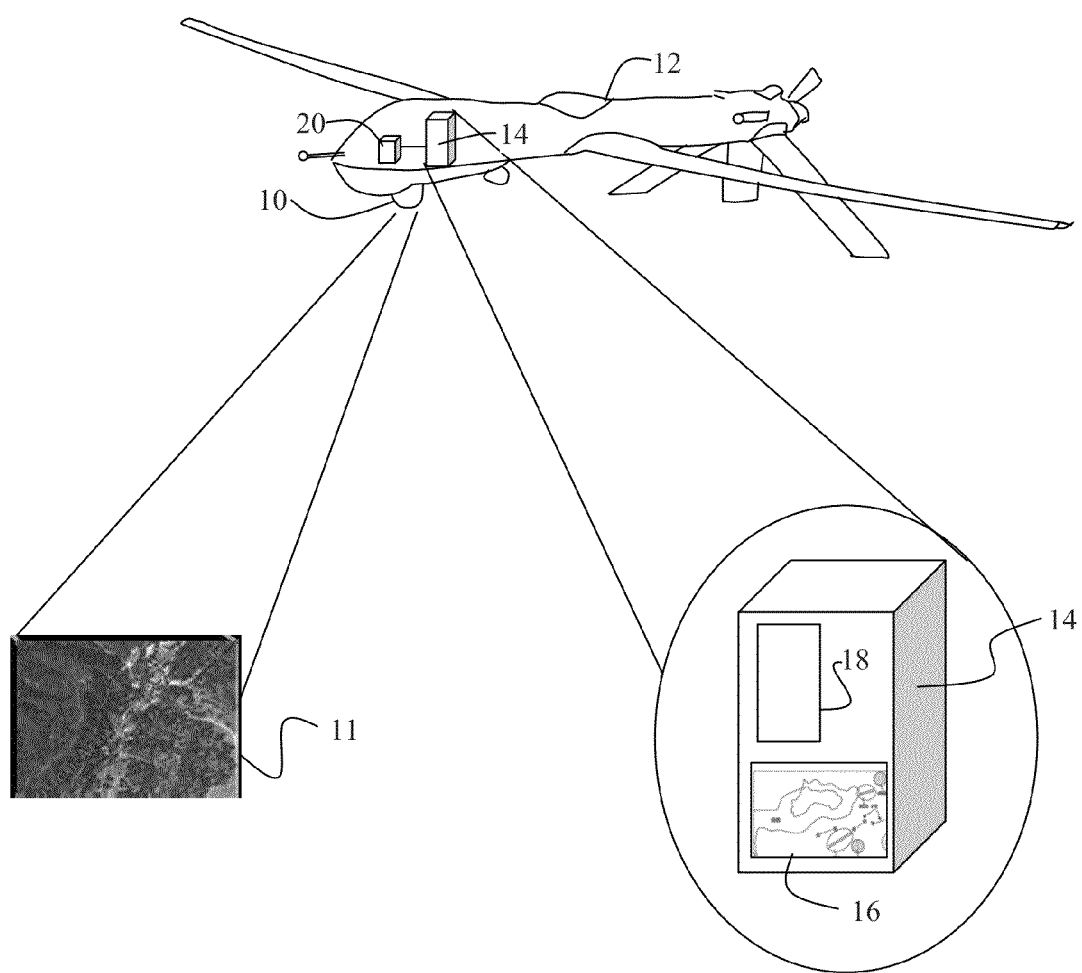
FIG. 1A is a pictorial view of elements of an example embodiment.
Figure 1B:
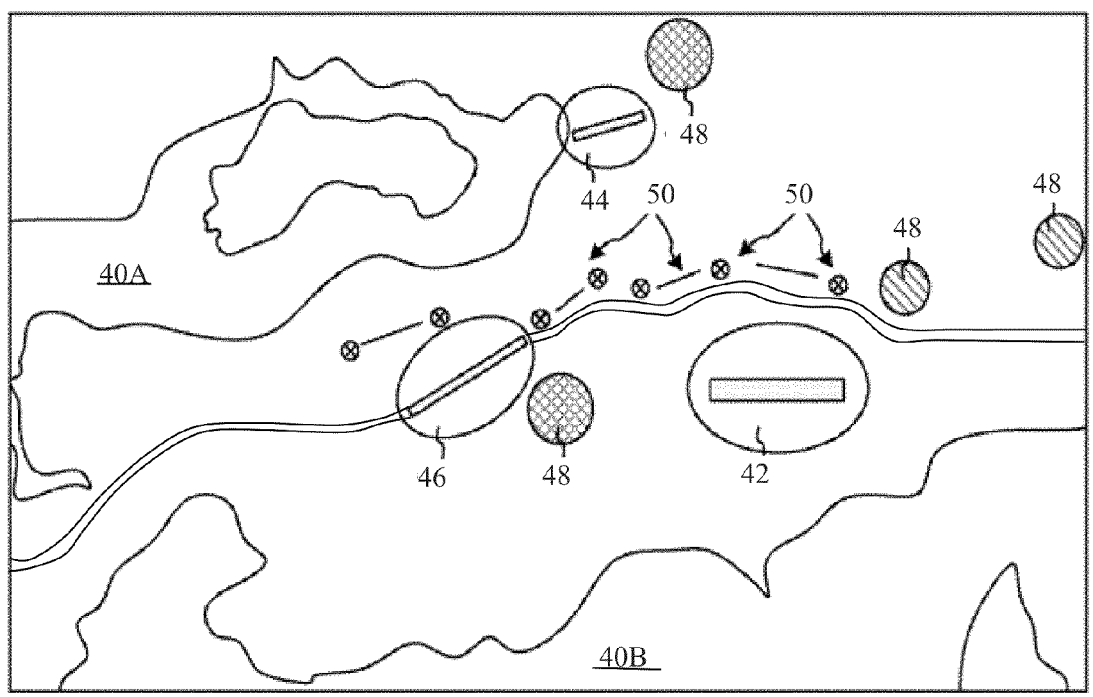
FIG. 1B is a terrain map detail.

Referring to FIG. 1A, an example embodiment consists of two primary subsystems. First, a terrain mapping sensor 10 (LIDAR, SAR, etc.) is mounted on an aircraft 12 in such a manner that it has 360 degree view of the local terrain 11. An onboard processor 14 receives and translates raw data streams from returns by the mapping sensor 10 into a terrain map 16 (shown in greater detail discussed subsequently with respect to FIG. 1B) that can be analyzed for profile, extent and obstructions to determine optimal landing sites given the aero-kinematic performance of the aircraft, as will be described in greater detail subsequently. Second, a Safe Area Flight Emergency (SAFE) algorithm represented as 18 and as described in U.S. Pat. No. 7,689,328 entitled Determining Suitable Areas for Off-Airport Landings issued. on Mar. 30, 2010 and additionally described in U.S. patent application Ser. No. 12/764,797 entitled "Determining Landing Sites For Aircraft" filed on Apr. 21, 2010 is executed by the onboard processor.

Depending on the application, appropriate processing and integration to the flight controls by the onboard processor is accomplished through connection to an autopilot 20, in either a manned aircraft or a UAS application, or alternatively as visual displays in a cockpit instrument system for a manned aircraft with actual flight control input accomplished by the pilot. The processing power required by the onboard processor is dependent on 1) the efficiency of the SAFE algorithm and 2) the grid size chosen for the calculation to be performed. The finer the grid, the more processing is required. SAFE operates by generating spanning trees from the aircraft position to the desired landing site as described in application Ser. No. 12/764,797 entitled Determining Landing Sites For Aircraft. The best route is chosen based on rules such as staying above the minimum altitude required to make it to the site in a contingency operation.

Figure 2:
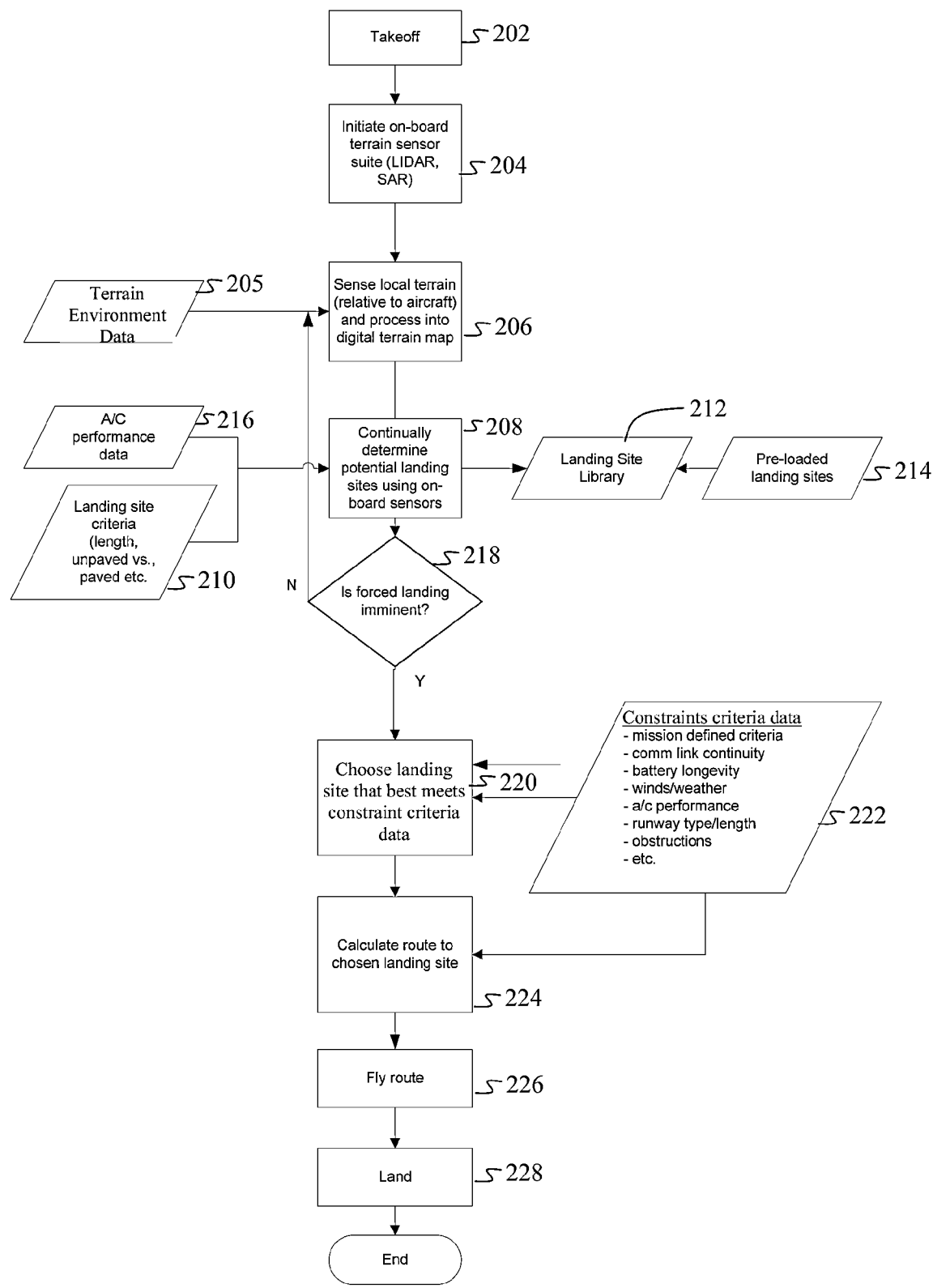
FIG. 2 is a flow chart showing operation of the embodiment.

The processing sequence for the embodiment described is shown in detail in FIG. 2. Upon takeoff, step 202, the terrain mapping sensor 10 is initiated, step 204. Sensing of local terrain in proximity to the aircraft is accomplished by the terrain mapping sensor receiving actual terrain environment data, 205, and processing it into a terrain map (e.g., digital terrain map), step 206. As show in FIG. 1B, the terrain map may be a combination of predetermined geographical data with updates provided by the terrain mapping sensor 10, General terrain profiles 40A and 40B are presented and potential landing sites such as existing airports 42, 44, roads 46, open flat terrain with minimal vegetation such as areas 48, and man-made obstacles such as power lines 50. Potential landing sites are determined based on the sensed terrain identified in the terrain map, step 208, taking into account surface characteristics corresponding to landing site criteria 210 (flatness, length, vegetation or prepared surface, unpaved, paved, etc). The potential landing sites are loaded into a landing site library, 212, for use by the on-board processor 14. The landing site library may also include a set of pre-loaded landing sites, 214, prior to takeoff based on anticipated route or other predetermined criteria. The determination of potential landing sites also employs current aircraft performance data, 216, for real-time assessment of which landing sites in the library may be reached by the aircraft for landing under an emergency condition. While preloaded data may include some "unprepared or off-field" landing sites, the availability of accurate real-time sensing of data from the terrain mapping sensors allows confirmation of the status of such landing sites which are not normally maintained. Additionally, seasonal or real time changes to terrain such as crop harvesting, deforestation due to logging, newly added roads or other prepared geographic features that may now provide sufficient length, surface composition and accessibility to act as a landing site can be sensed by the terrain mapping sensors for update/verification of the landing sites data.

If a forced landing is imminent, step 218, the processor chooses a landing site, step 220, best meeting a set of constraint criteria data, 222. Constraints may include mission defined criteria (security requirements, material hazards or other exposure constraints), communications link continuity for continued communications between the aircraft and ground controllers, battery longevity (life of communications and control capability), actual winds and weather conditions, actual aircraft performance including degradation based on the emergency condition, runway or landing zone type and length, and obstructions proximate the landing zone. Landing site selection from the landing site library includes both preloaded and real-time data from the terrain mapping sensor.

Figure 3A:
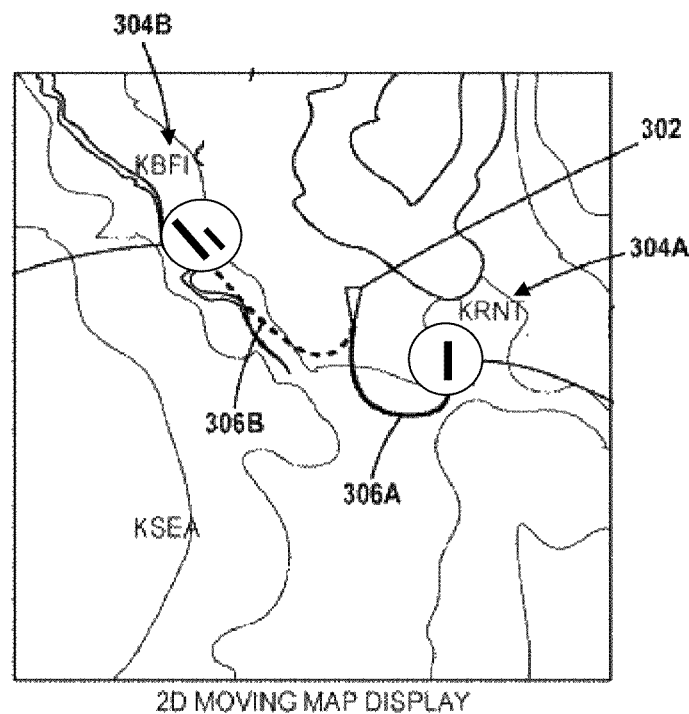
FIG. 3A is a horizontal display of landing path routing.
Figure 3B:
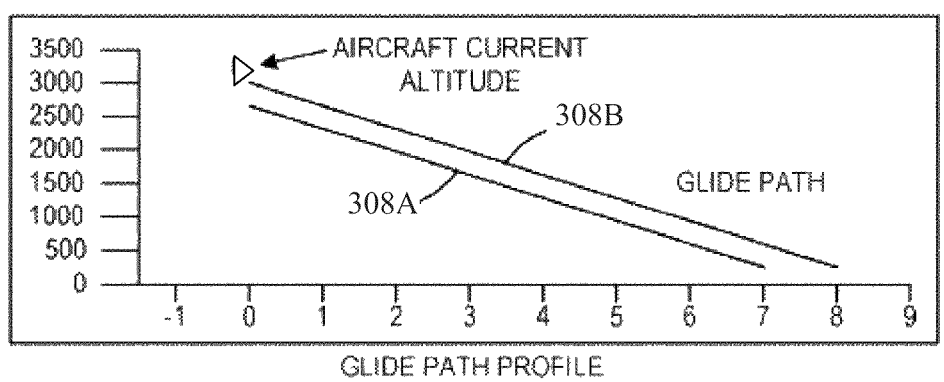
FIG. 3B is a vertical display of landing path routing.
Figure 4A:
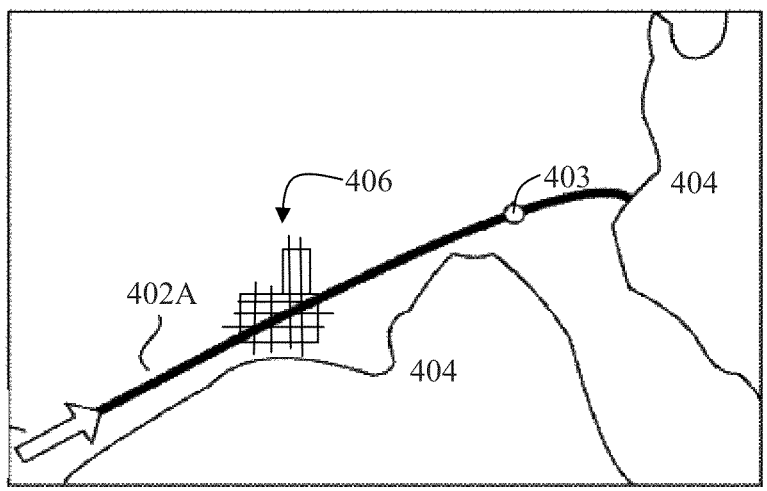
FIG. 4A is a selected first routing path.
Figure 4B:
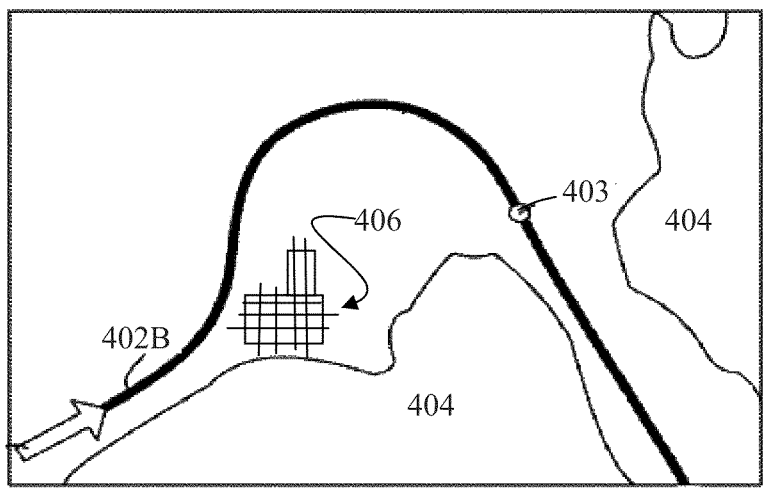
FIG. 4B is a modified selected routing path.

Once the landing site has been selected, the processor calculates a route to the chosen landing site, step 224, again employing the set of constraint criteria data, 222. Landing route selection may include determinations of overflight issues due to mission defined criteria (as an example: no populated area overflight), and geographical considerations. As shown in FIGS. 3A and 3B, from the air vehicle current position 302 to potential landing sites 304A or 304B, ground tracks 306A and 306B may be established based on geographical or other constraints data while requirements for vertical profiles 308A and 308B may be determined based on air vehicle performance constraints. The route determination may be based on spanning tree calculations as described in application Ser. No. 12/764,797 entitled "Determining Landing Sites For Aircraft". A selected route 402A may then be modified as shown in FIGS. 4A and 4B to route 402B to achieve a specific route point 403 but accommodate requirements imposed by terrain 404 or physical feature avoidance such as a town 406. Real time terrain mapping sensor data may be employed in the route calculations to update preloaded landing site data.

Figure 5:
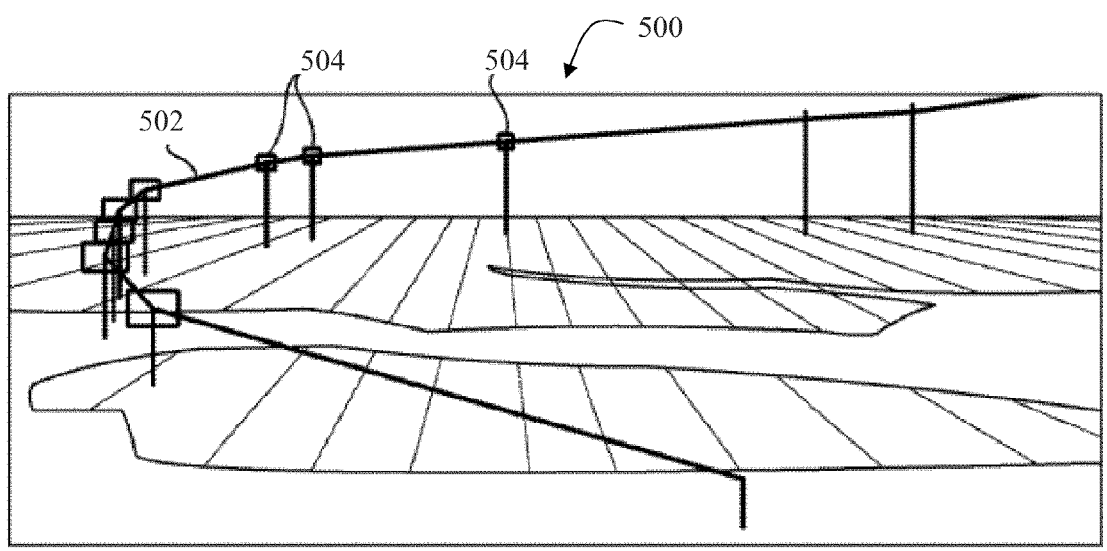
FIG. 5 is an instrument display of a "fly to" path for pilot direction.

The route is then flown, step 226, by the autopilot 20 in either a UAV or piloted aircraft, or route data may he provided to a cockpit display 500 providing a "fly to" profile 502 with guidance boxes 504 as shown in FIG. 5 for guidance to the pilot of a piloted aircraft. A landing is then executed at the selected landing site, step

Having now described various embodiments of the invention in detail as required by the patent statutes, those skilled in the art will recognize modifications and substitutions to the specific embodiments disclosed herein. Such modifications are within the scope and intent of the present invention as defined in the following claims.

What is claimed is:

1. A system for autonomous direction of an aircraft to emergency/contingency landing sites comprising:
   a terrain mapping sensor;
   an onboard processor receiving terrain data from the terrain mapping sensor, said processor further having software modules for processing the terrain data to produce a terrain map and for selecting and creating a landing profile based on the terrain map; and,
   an autopilot wherein the landing profile is executed by the autopilot.

2. The system for autonomous direction of an aircraft to emergency/contingency landing sites as defined in claim 1 wherein the terrain mapping sensor is selected from the set of Light Detection and Ranging (LIDAR) or Synthetic Aperture Radar (SAR).

3. A system for autonomous direction of an aircraft to emergency/contingency landing comprising:
   a terrain mapping sensor;
   an onboard processor receiving terrain data from the terrain mapping sensor, said processor further having software modules for processing the terrain data to produce a terrain map and for creating a landing profile based on the terrain map, wherein the landing profile is selected from a plurality of spanning tree calculations employing the terrain map.

4. The system for autonomous direction of an aircraft to emergency/contingency landing sites as defined in claim 3 further comprising an autopilot and wherein the landing profile is executed by the autopilot.

5. The system for autonomous direction of an aircraft to emergency/contingency landing sites as defined in claim 3 wherein the landing profile is displayed on a cockpit display for a pilot.

6. The system for autonomous direction of an aircraft to emergency/contingency landing sites as defined in claim 3 further comprising a preloaded landing site library.

7. The system for autonomous direction of an aircraft to emergency/contingency landing sites as defined in claim 3 further comprising a plurality of predefined constraints for selection of the landing profile.

8. The system for autonomous direction of an aircraft to emergency/contingency landing sites as defined in claim 3 further comprising a set of landing site criteria determined based on aircraft performance.

9. A method for autonomous direction of an aircraft to emergency/contingency landing sites comprising:
  using an onboard sensor for selecting potential landing sites;
  generating a landing profile based on a selected one of said potential landing sites; and,
  executing the landing profile using the autopilot.

10. The method as defined in claim 9 wherein the onboard sensor is a terrain mapping sensor.

11. The method as defined in claim 10 wherein the terrain mapping sensor is selected from the set of Light Detection and Ranging (LIDAR) or Synthetic Aperture Radar (SAR).

12. The method as defined in claim 10 wherein the step of using a terrain mapping sensor comprises receiving actual terrain environment data with the sensor and processing the data into a digital terrain map.

13. The method as defined in claim 12 wherein step of generating a landing profile comprises:
  choosing a landing site best meeting a set of constraint criteria;
  calculating a route to the chosen landing site employing the constraints data.

14. A method for autonomous direction of an aircraft to emergency/contingency landing sites comprising:
  using a terrain mapping sensor for selecting potential landing sites;
  choosing a landing site best meeting a set of constraint criteria;
  calculating a route to the chosen landing site employing the constraints data based on a selected one of said potential landing sites wherein the step of calculating a route includes calculating a plurality of spanning trees employing the terrain map.

15. The method as defined in claim 14 wherein the step of calculating a route further includes modifying a selected route to accommodate requirements imposed by terrain or physical feature avoidance.

16. The method as defined in claim 14 further comprising executing the landing profile with an autopilot.

17. The method as defined in claim 14 further comprising displaying the landing profile on a cockpit display.

18. A method for autonomous direction of an aircraft to emergency/contingency landing sites comprising:
  initiating a terrain mapping sensor;
  sensing of local terrain in proximity to the aircraft with the terrain mapping sensor receiving actual terrain environment data;
  processing the terrain environment data into a digital terrain map;
  determining potential landing sites based on the sensed terrain identified in the terrain map taking into account surface characteristics corresponding to landing site criteria;
  loading landing sites into a landing site library;
  if a forced landing is imminent choosing a landing site best meeting a set of constraint criteria;
  calculating a route to the chosen landing site employing the constraints data; and,
  flying the calculated route to execute a landing.

19. The method defined in claim 18 wherein the step of flying the calculated route comprises using an autopilot to fly the calculated route.

20. The method defined in claim 18 wherein the step of flying the calculated route includes presenting the calculated route on a display.

* * * * *